United States Patent
Lacy

(10) Patent No.: US 8,122,802 B2
(45) Date of Patent: Feb. 28, 2012

(54) MULTI-FUNCTION POWER SAW

(76) Inventor: Lawrence Lacy, Clifton Forge, VA (US)

( * ) Notice: Subject to any disclaimer, the term of this patent is extended or adjusted under 35 U.S.C. 154(b) by 1551 days.

(21) Appl. No.: 10/970,048

(22) Filed: Oct. 21, 2004

(65) Prior Publication Data
US 2007/0039441 A1 Feb. 22, 2007

(51) Int. Cl.
B23D 45/04 (2006.01)
B23D 45/14 (2006.01)
B26D 1/157 (2006.01)
B26D 7/01 (2006.01)
B27B 5/20 (2006.01)
B27B 5/24 (2006.01)
B27B 5/29 (2006.01)

(52) U.S. Cl. ....... 83/438; 83/467.1; 83/468.1; 83/468.6; 83/468.7; 83/471.3; 83/473; 83/477.1; 83/486.1

(58) Field of Classification Search ............ 83/477.2, 83/485, 438, 467.1, 468.1, 468.6, 468.7, 83/471.2, 471.3, 472, 473, 477, 477.1, 483, 83/486, 486.1, 490
See application file for complete search history.

(56) References Cited

U.S. PATENT DOCUMENTS
1,789,125 A * 1/1931 Wilderson ............ 83/438
(Continued)

*Primary Examiner* — Clark F. Dexter
(74) *Attorney, Agent, or Firm* — Hamilton & Terrile, LLP; Michael Rocco Cannatti

(57) ABSTRACT

A power saw includes a saw assembly attached to a base assembly with an offset support that provides a clear path in line with the saw blade, thereby providing a miter saw, a table saw or a radial arm saw The height of the offset support is adjustable to make dado cuts, and a tilt mechanism is mounted at the top of the offset support to provide an "apparent" tilt axis near the top surface of the turntable, thereby eliminating an axle near the turntable top surface. A first fence used for miter cuts may be moved or removed during table cut operations. Alternatively, a reversible fence may be used for miter cuts when configured and affixed to the base assembly in a first position, and may be used for table or radial cuts when configured and affixed to the base assembly in a second position.

11 Claims, 12 Drawing Sheets

U.S. PATENT DOCUMENTS

| | | | | |
|---|---|---|---|---|
| 3,302,669 A | * | 2/1967 | Edler | 83/471.3 |
| 3,344,819 A | * | 10/1967 | Mitchell | 83/471.3 |
| 3,581,784 A | * | 6/1971 | Warrick et al. | 83/477.1 |
| 3,604,482 A | * | 9/1971 | Warrick et al. | 83/473 |
| 4,024,783 A | | 5/1977 | Sturgis | 83/468 |
| 4,036,093 A | | 7/1977 | Thorsell | 83/471.3 |
| 4,209,045 A | | 6/1980 | Bassett | 144/48.7 |
| 4,481,846 A | | 11/1984 | Goodell | 83/438 |
| 4,574,670 A | * | 3/1986 | Johnson | 83/409 |
| 4,867,425 A | | 9/1989 | Miraglia, Jr. | 269/1 |
| 5,148,846 A | | 9/1992 | Van Gelder | 144/250.13 |
| 5,189,801 A | | 3/1993 | Nicely | 33/42 |
| 5,813,126 A | | 9/1998 | Dahl | 33/474 |
| 6,101,729 A | | 8/2000 | Stringari | 33/474 |
| 6,240,822 B1 | | 6/2001 | Musser | 83/446 |
| 6,662,697 B1 | * | 12/2003 | Chen | 83/471.3 |
| 6,860,183 B1 | * | 3/2005 | Chen | 83/471.3 |
| 7,430,949 B2 | * | 10/2008 | Chiu | 83/473 |
| 2003/0217629 A1 | * | 11/2003 | Chen | 83/471.3 |
| 2006/0266186 A1 | * | 11/2006 | Ozawa et al. | 83/473 |

* cited by examiner

MULTI-FUNCTION POWER SAW

BACKGROUND OF THE INVENTION

1. Field of the Invention

The present invention relates in general to the field of power saw technology. In one aspect, the present invention relates to a power saw device that combines the functions of a miter saw, a table saw, and a radial arm saw into one portable unit.

2. Description of the Related Art

Conventional woodworking power saws typically perform either a rip cutting function along the length of a board, or a cross cutting function across the length of a board. Whatever the dedicated cutting function, such power saws are usually designed for only one type of cutting function, and are not readily adapted to provide multiple types of cutting functions.

For example, table saws that are intended for ripping may be large, fixed units or smaller portable units, and are usually designed to include a base, a slidably-adjustable fence, and a saw assembly with a motor, a switch, a blade, a blade guard, and anti-kickback devices. While cross cuts are possible, they often are difficult and inefficient.

Another example of a conventional power saw is a miter saw which is designed to be portable and to cross cut at various angles. Miter saws are usually designed to include a base, a turntable, fixed fences, and a saw assembly with a motor, a switch, a blade, and a blade guard. The fences may be two separate fences on either side of the blade or one unit that spans the saw blade. The saw assembly is typically attached to the turntable by means of a support that is aligned with the blade. While conventional miter saw supports may be pivoting (which moves the saw assembly up and down), rail mounted (which moves the saw assembly forward and backward) and/or tilting (for cutting angles offset from vertical), the support is typically affixed to the base or turntable in such a way as to prevent or impede rip cuts from being made. Miter saws generally have locking mechanisms to secure the saw assembly in a fixed position for transportation.

Yet another example of a conventional power saw is a radial arm saw which is typically a large, fixed unit that may rip or cross cut. Radial arm saws have a base, a fixed fence, a saw assembly with a motor, one or more rails, a switch, a blade, a blade guard, and anti-kick devices. Generally, the saw assembly moves forward and backward on the rails to make cross cuts. The rail mount may pivot to make angled cross cuts. In addition, the saw assembly may be rotated and locked in a fixed position to make rip cuts or tilted to make non-vertical cuts. Radial arm saws may also make dado cuts part way through the material to form notches by raising and lowering the saw assembly.

As seen from the conventional power saws, a need exists for an improved multi-function power saw apparatus that can be flexibly configured to provide rip cuts, cross cuts and dado cuts. There is also a need for small, portable tools that can be used at various work sites for relatively short periods of time by building contractors and maintenance workers. In addition, there is a need for a more compact and cost efficient multi-function power saw tool for use by home workshop users who need to conserve space and minimize costs. Moreover, there is a need for an improved fence design which may be used with a variety of different power saw designs. Further limitations and disadvantages of conventional systems will become apparent to one of skill in the art after reviewing the remainder of the present application with reference to the drawings and detailed description which follow.

SUMMARY OF THE INVENTION

Briefly stated, a power saw is provided that may be flexibly configured to perform multiple cutting functions, thereby providing a miter saw, a table saw or a radial arm saw as desired by the user. A fixed or adjustable offset support enables the flexible configurations by attaching the saw assembly to the turntable in such a way that there is an unobstructed path under the saw in line with the cutting plane of the cutting blade. In addition, a tilt mechanism for making non-vertical cuts may be attached to the saw assembly in such a way that there is no tilt hinge or axle at the cutting surface of the turntable or base that would obstruct the cutting path under the saw. A movable fence is also provided that may be affixed in a plurality of positions to guide the placement of materials in any of the miter saw, table saw, or radial saw configurations.

The objects, advantages and other novel features of the present invention will be apparent from the following detailed description when read in conjunction with the appended claims and attached drawings.

DETAILED DESCRIPTION

An improved multi-function power saw device 100 is described whereby the device may be flexibly and readily configured as a miter saw, a table saw and/or a radial arm saw. While various details are set forth in the following description, it will be appreciated that the present invention may be practiced without these specific details. For example, selected aspects are shown in block diagram form, rather than in detail, in order to avoid obscuring the present invention. In addition, the components in the figures are not necessarily to scale, emphasis instead being placed upon illustrating the principles of the invention. Such descriptions and representations are used by those skilled in the power saw arts to describe and convey the substance of their work to others skilled in the art.

Figure 1A:
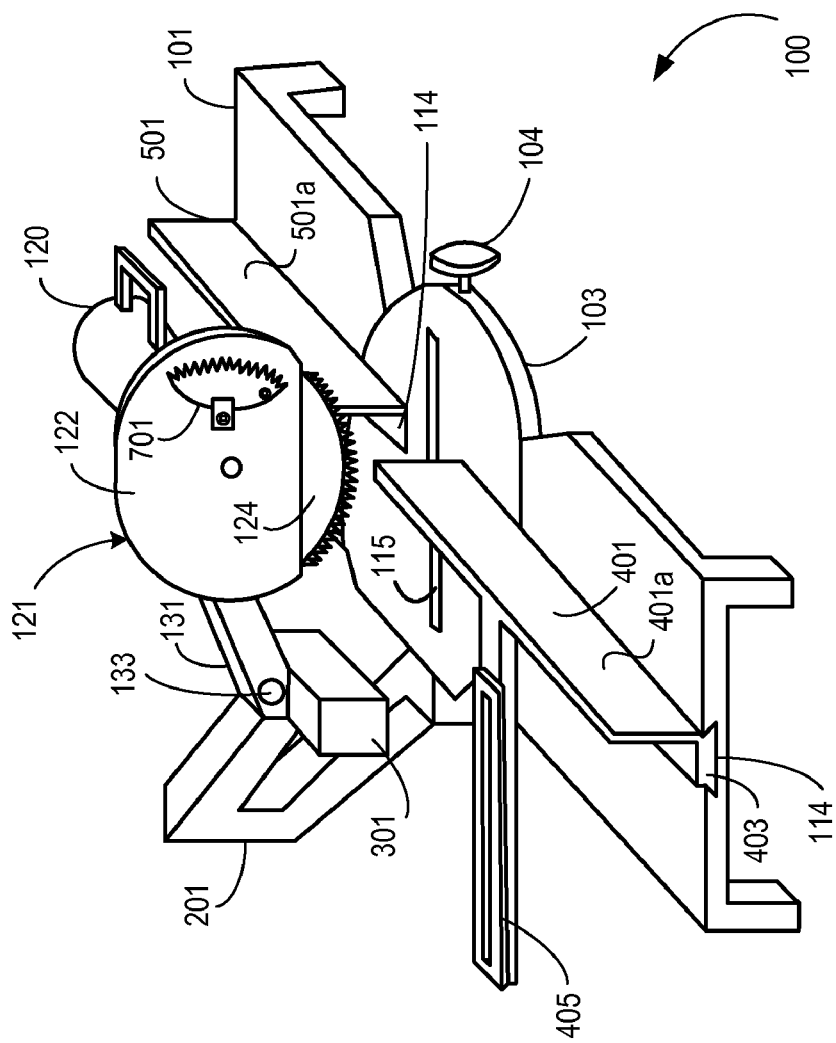
FIG. 1A depicts an illustrative selected embodiment of the present invention implemented with a pivoting type saw mount.

FIG. 1A shows a multi-function power saw device 100 configured as a miter saw assembly implemented with a pivoting type saw mount. As described herein, the references in the figures to directions will be from the perspective of an operator or user, such that "front" will be the part of the device closest to the operator, "left" will be the operator's left, "right" will be the operator's right, and "back" will be the part of the device furthest from the operator. As depicted in FIG. 1A, the power saw device includes a base assembly, the base assembly including a base 101, a turntable 103, and a turntable locking mechanism 104. A saw assembly 121 is also depicted that includes a motor 120, a blade 124, a blade guard 122, and a switch (not shown). The switch is usually a trigger switch which must be held by the user to operate the saw when it is in miter mode. In addition or in the alternative, a run switch (not shown) provides continuous operation of the saw when it is in the rip mode. A safety switch (not shown) ensures that the saw blade is locked in the rip or dado position prior to operation. The turntable 103 and saw assembly 121 are operably assembled to rotate approximately 45 degrees left and right to enable cuts of various degrees to be made.

In accordance with a selected embodiment of the present invention, the saw assembly 121 is supported by a pivoting support 131 and an offset support 201. As depicted, the offset support 201 supports the saw assembly 121 with a laterally displaced support assembly that provides a clear path in line with the axis of the saw blade 124 so that boards moving along the front/back axis of the device can be rip cut when the power saw device is configured as a table saw. Whatever the cutting configuration of the power saw device, the pivoting support 131 allows the saw assembly 121 to be raised and lowered by rotation around its pivoting axis, and may be locked in a fixed position by a pivot locking mechanism 133.

In addition or in the alternative, the offset support 201 and/or pivot support 131 may be attached to a tilt mechanism 301 (illustrated more fully in FIGS. 3A and 3B) which tilts the saw assembly 121 for cutting angles offset from vertical. In particular and as illustrated in FIGS. 2A, 2B, 2C and 2D, the tilt mechanism 301 is mounted at the top of the offset support 201 including support members 205 and 207, by means of mounting brackets 202, 303. With this mounting, the tilting mechanism 301 is displaced from the cutting surface of the turntable 103 while providing an apparent tilt axis near the top surface of the turntable 103 which assures that saw blade 124 is aligned with cutting channel 115 in turntable 103.

Figure 1B:
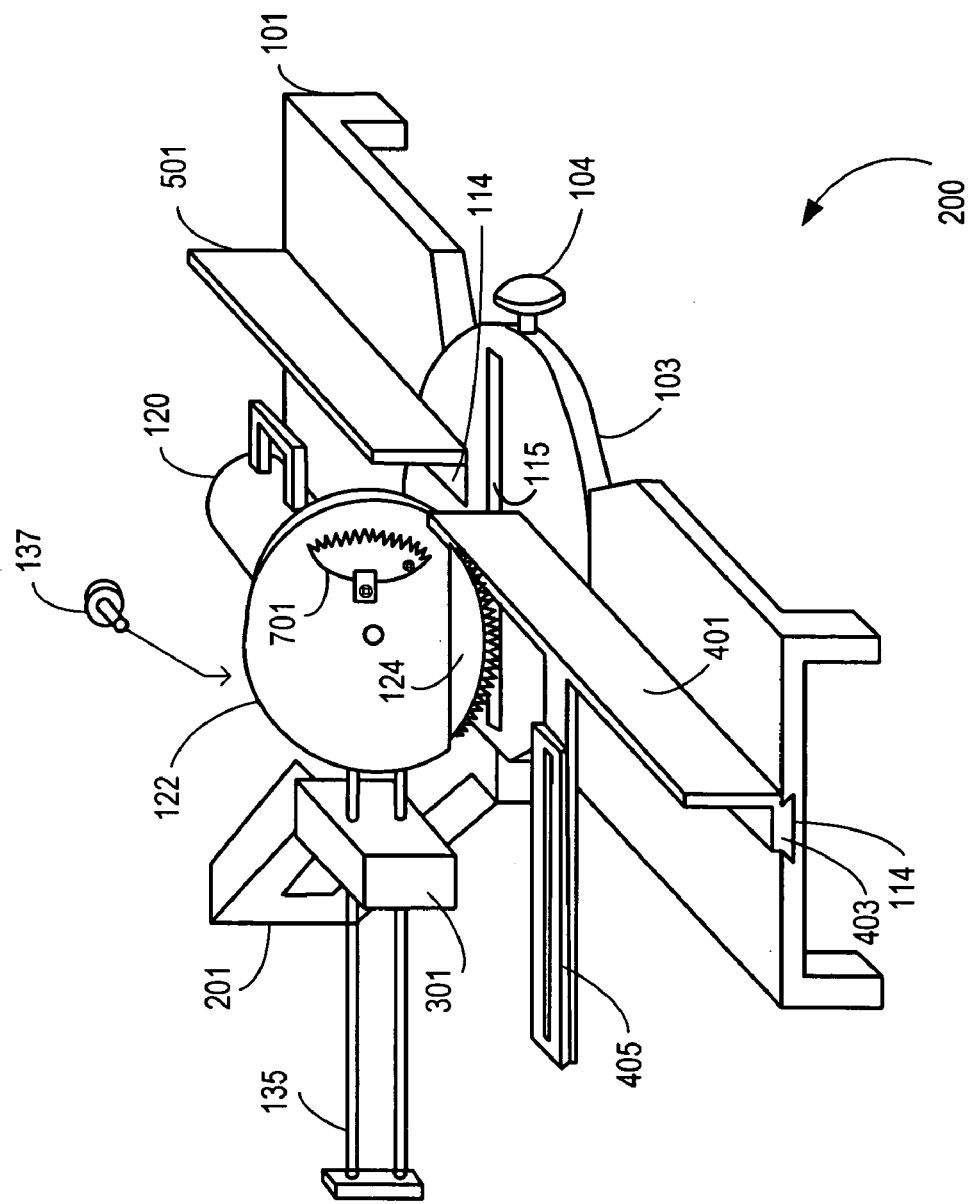
FIG. 1B depicts an illustrative embodiment of the present invention implemented with a rail type saw mount.
Figure 4A:
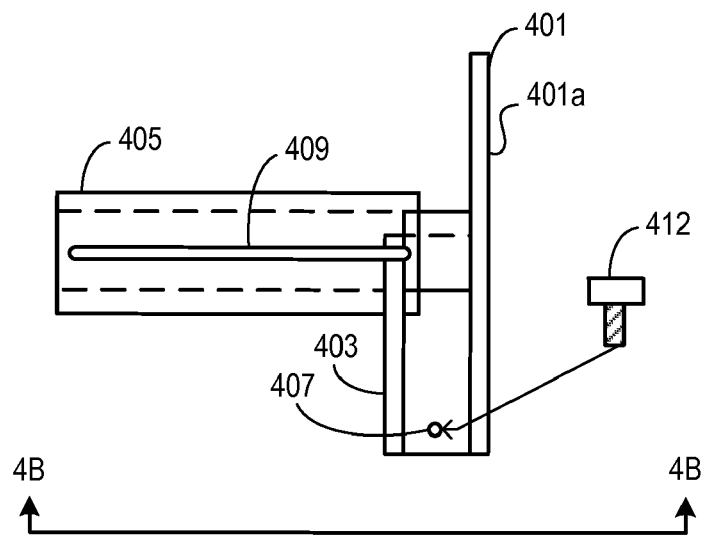
FIG. 4A illustrates a top view of a selected embodiment of a reversible fence.
Figure 4B:
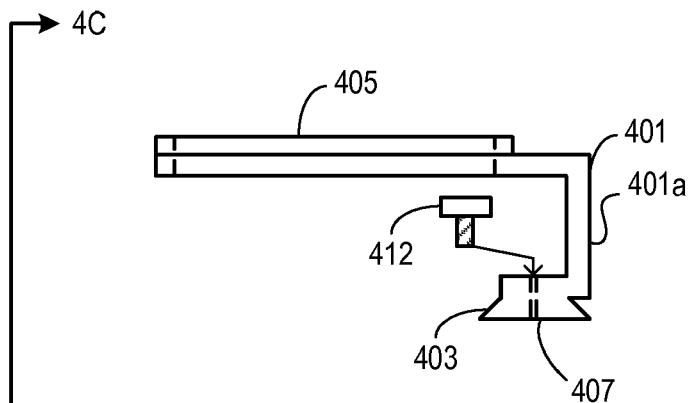
FIG. 4B is a left view of the reversible fence depicted in FIG. 4A.
Figure 4C:
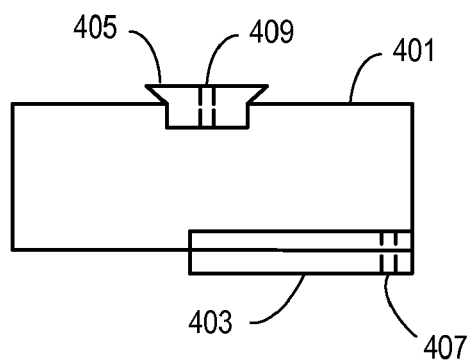
FIG. 4C is a back view of a reversible fence depicted in FIG. 4A.

In accordance with another illustrative embodiment of the present invention illustrated in FIGS. 1A and 1B, the multi-function power saw device 100 includes a reversible fence 401 (illustrated more fully in FIGS. 4A, 4B, and 4C). As illustrated in the miter saw configuration of FIG. 1A, the reversible fence 401 includes a miter position slide member 403 that is slidably engaged in the guide channel 114 of the base 101. While a dovetail guide channel 114 is illustrated in the figures, it will be appreciated by persons having ordinary skill in the mechanical arts that other configurations and fixture techniques will serve the same function. In addition, the multi-function power saw device 100 may include a removable fence 501 that is provided for use in the miter saw configuration, but that may be removed when the multi-function power saw device 100 is configured as a table saw. As illustrated more fully in FIGS. 5A, 5B, and 5C, the removable fence 501 includes a miter position slide member 503 that is slidably engaged in the guide channel 114 of the base 101. In the configuration depicted in FIG. 1A, the front or guiding faces 401a, 501a of the reversible fence 401 and removable fence 501 are used to guide or secure a board that is being cross cut by the blade 124.

The multi-function power saw device 100 depicted in FIG. 1A may be converted into a table or radial arm saw configuration by locking the saw assembly 121 in the correct position with pivot lock 133 which activates a safety switch (not shown). Upon unlocking the removable fence 501 (see FIG. 5A), the fence 501 may be moved or removed. In addition, reversible fence 401 may be unlocked (see FIG. 4B) and reversed such that the table saw position slide member 405 is inserted into guide channels 114 in base 101 only or in both the base 101 and turntable 103. In this table saw configuration, the guiding face 401a of reversible fence 401 is aligned in parallel to the cutting plane of blade 124 and may be locked into a position at the desired distance from blade 124. For example, the turntable 103 or base 101 may include a visual indication (such as a scale or ruler (not shown) affixed to base 101) to indicate the rip width of the cut. Once anti-kickback devices 701 (illustrated more fully in FIGS. 7A and 7B) are lowered into the rip position, a run switch (not shown) is activated by the user. Conversely, a multi-function power saw device 100 configured as a table saw may be converted to a miter saw configuration by reversing the position of the fence 401 and inserting the removable fence 501 into the guide channels 114 to arrive at the configuration shown in FIGS. 1A and 1B.

As will be appreciated by persons having ordinary skill in the art, the saw assembly 121 may be affixed to the base 101 in a variety of different ways without impairing the ability of the power saw device to be configured in multiple cutting configurations. For example, instead of being connected to a pivot support 131 depicted in FIG. 1A, the saw assembly 121 of the multi-function power saw device 200 depicted in FIG. 1B may be connected to a rail support 135, which in turn is affixed to a tilt mechanism 301 and/or a fixed offset support 201. In the arrangement illustrated in FIG. 1B, the saw assembly 121 moves forward and backward along the rail support 135, and may be locked in place by a rail lock 137. A saw assembly pivoting mechanism similar to pivoting support 131 described in FIG. 1A may be incorporated in this configuration.

Figure 2A:
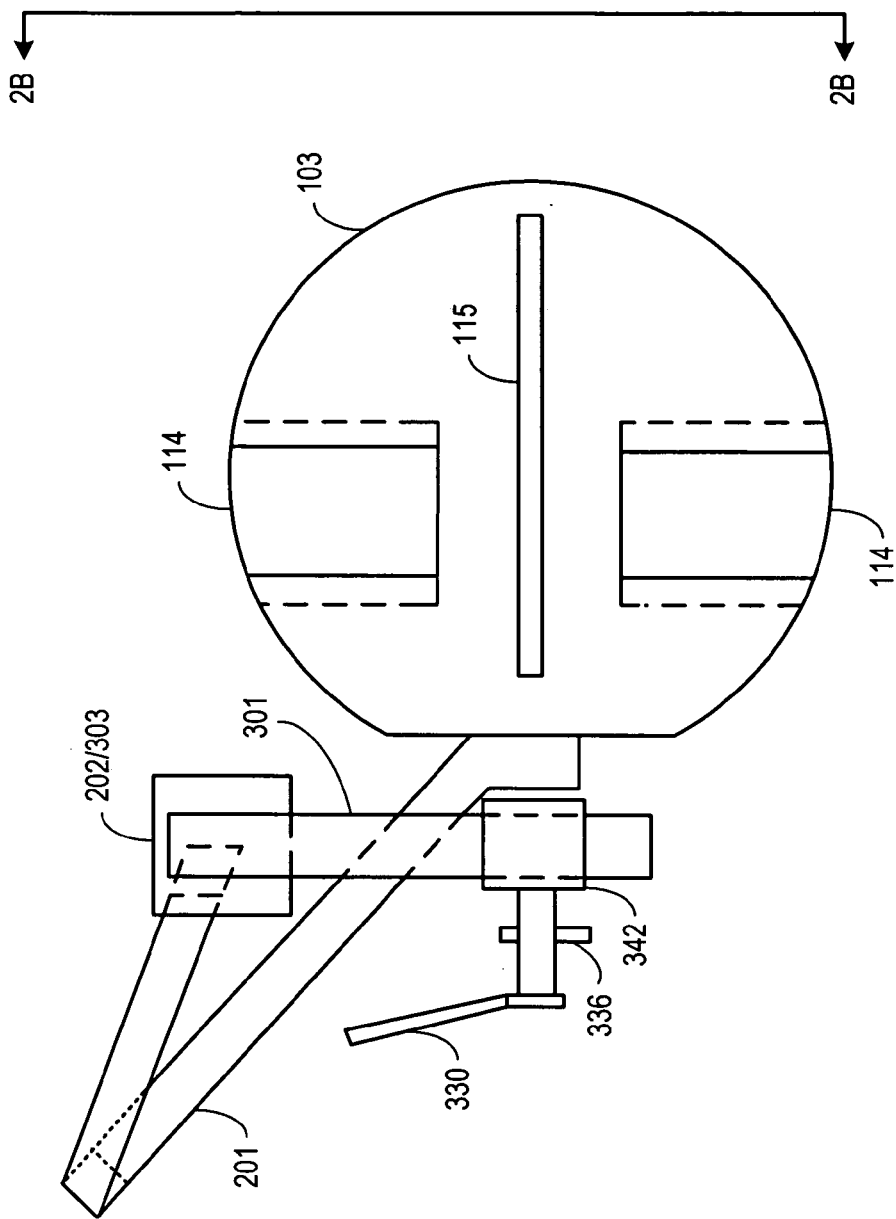
FIG. 2A illustrates a top view of a selected embodiment of the offset support.
Figure 2B:
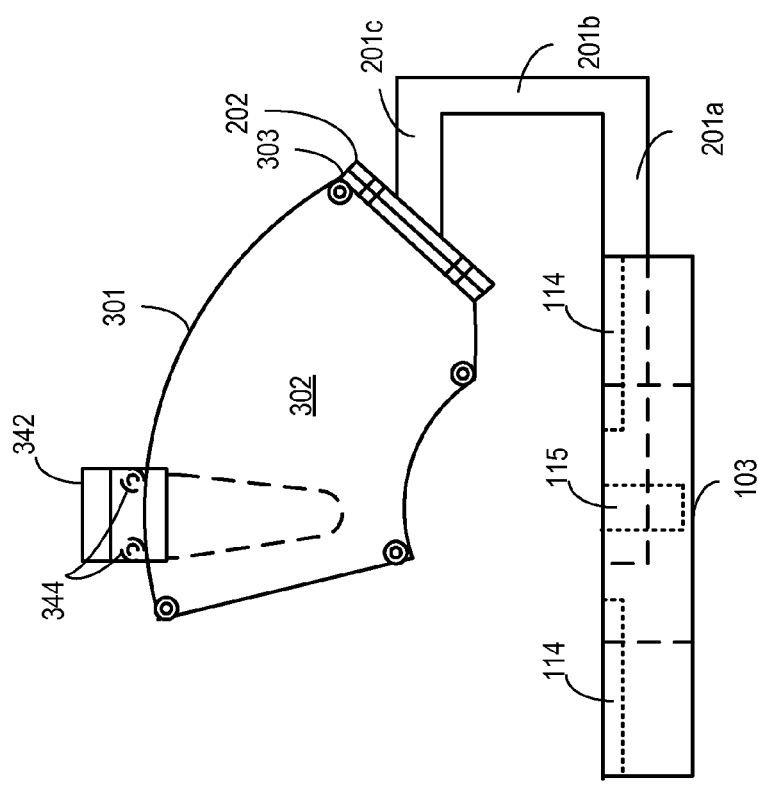
FIG. 2B is a front view of the offset support depicted in FIG. 2A.

Turning now to FIGS. 2A and 2B, top and front views, respectively, are illustrated of a selected embodiment of a fixed offset support 201 and tilt mechanism 301 that are attached to a turntable 103. In particular, FIG. 2A illustrates a top view of the turntable 103, offset support 201 and tilt mechanism 301, while FIG. 2B illustrates a front view (from the perspective of the "2B-2B" line in FIG. 2A). As depicted, the turntable 103 includes guide channels 114 and a cutting channel 115. The offset support 201 is affixed to the back of the turntable 103, and includes a lower lateral extension member 201a, a vertical extension member 201b and an upper lateral extension member 201c which includes a mounting bracket 202. Mounting bracket 202 is attached to offset support 201 and is compatible with the mounting bracket 303 (see FIGS. 3A and 3B) on the tilt mechanism 301. As will be appreciated by persons having ordinary skill in the mechanical arts, the lengths, angles and shapes of the extension members in offset support 201 may be varied to achieve any desired position(s), both horizontally and vertically, of the tilt mechanism 301 or saw assembly 121 with respect to turntable 103. In addition, the offset support 201 may be positioned to the left or right of turntable 103, so long as an unobstructed path is provided for a board moving along the front/back axis of the turntable 103.

Figure 2C:
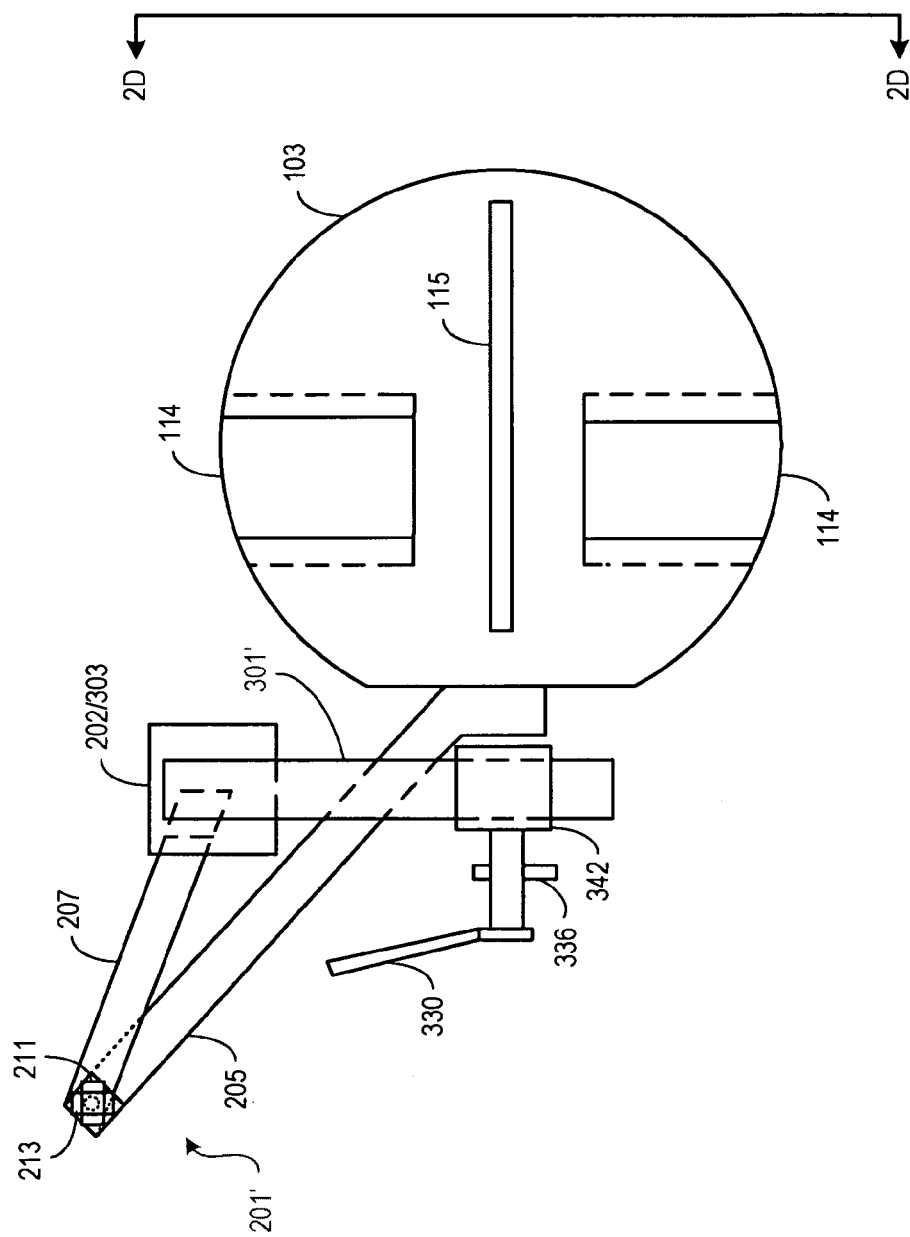
FIG. 2C illustrates a top view of an alternative embodiment of the offset support.
Figure 2D:
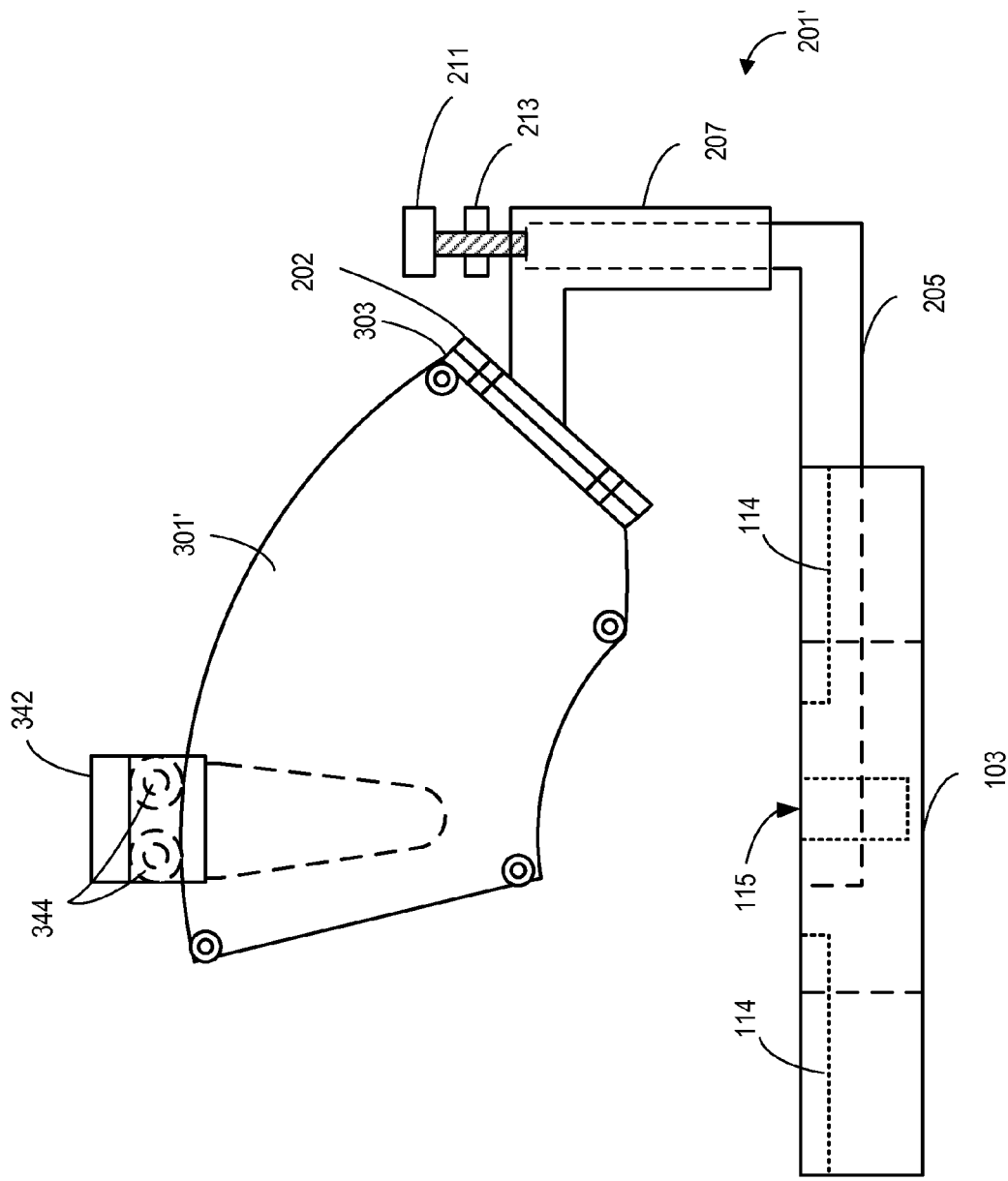
FIG. 2D is a front view of the offset support depicted in FIG. 2C.

FIGS. 2C and 2D illustrate top and front views, respectively, of an alternative embodiment of a height-adjustable offset support 201' and tilt mechanism 301' that are attached to a turntable 103. In particular, FIG. 2C illustrates a top view of the turntable 103, offset support 201' including support members 205 and 207, and tilt mechanism 301', while FIG. 2D illustrates a front view (from the perspective of the "2D-2D" line in FIG. 2C). By using the height-adjustable offset support, the height of the saw assembly 121 may be adjusted to make dado cuts. As depicted, the turntable 103 includes guide channels 114 and a cutting channel 115. The height adjustable offset support 201' is affixed to the back of the turntable 103, and includes a lower L-shaped support arm 205 and an upper L-shaped support arm 207 which is slidably engaged with the lower L-shaped support arm 205. In addition, a height adjustment mechanism 211 is provided to vary the distance between lower support arm 205 and upper support arm 207, thus raising or lowering the height of the saw blade in relation to base 101 and turntable 103. Locking device 213 is used to secure the saw blade at the desired height. Mounting bracket 202 is attached to upper L-shaped support arm 207 and is compatible with the mounting bracket 303 (see FIGS. 3A and 3B) on the tilt mechanism 301'. As will be appreciated by persons having ordinary skill in the mechanical arts, the lengths, angles and shapes of the support arms may be varied to achieve any desired position(s), both horizontally and vertically, of the tilt mechanism 301' or saw assembly 121 with respect to turntable 103. It will also be appreciated that other methods of attaining height adjustment are available, including, but not limited to, securing the saw assembly at various positions between the highest pivot point and the lowest pivot point, inclusive. In addition, the offset support 201' may be positioned to the left or right of turntable 103, so long as an unobstructed path is provided for a board moving along the front/back axis of the turntable 103.

Figure 3A:
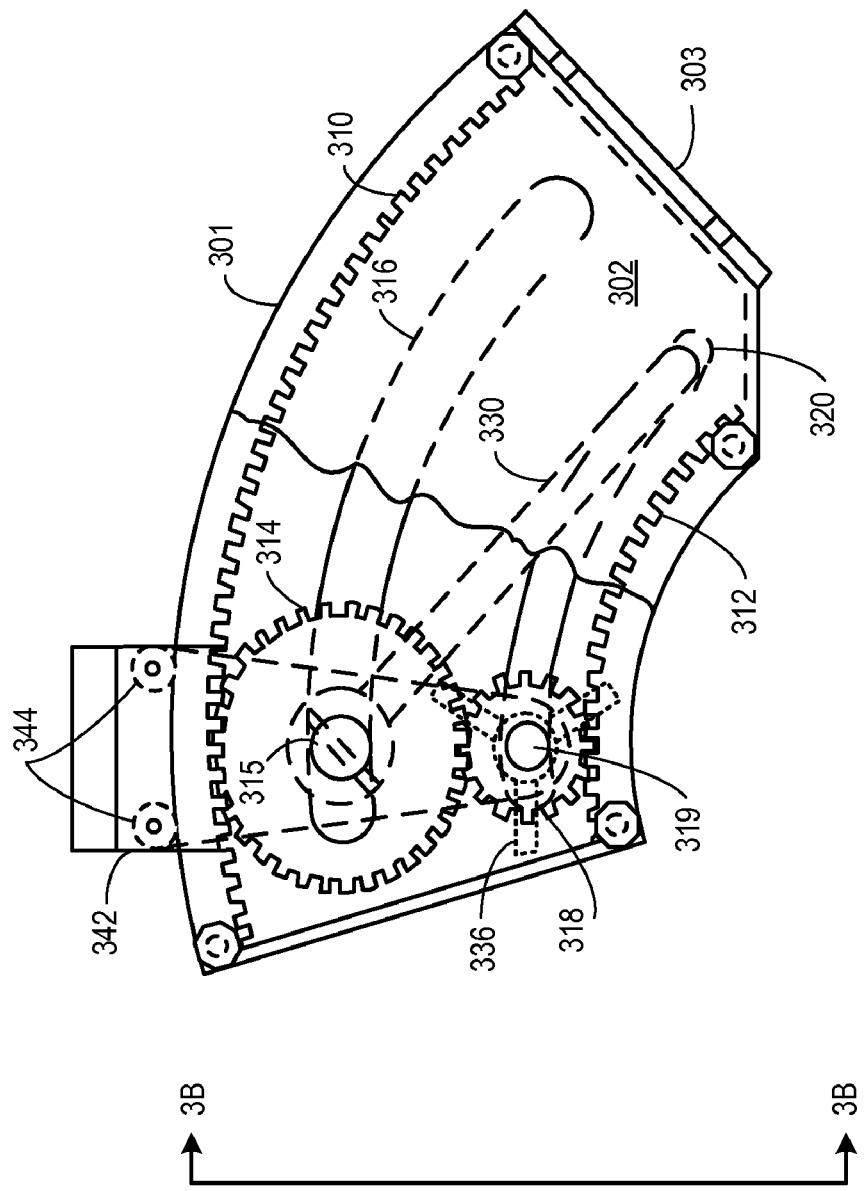
FIG. 3A is a front view of a selected embodiment of the tilt mechanism.
Figure 3B:
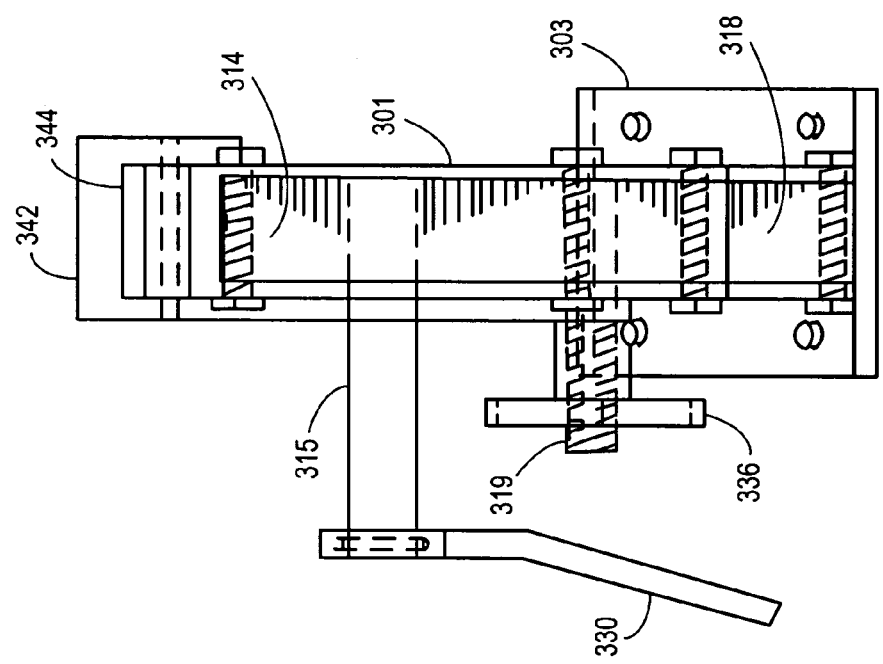
FIG. 3B is a left view of the tilt mechanism depicted in FIG. 3A.

Turning now to FIGS. 3A and 3B, additional detailed from and left views of a selected embodiment of the tilt mechanism are illustrated. In particular, FIG. 3A illustrates a front view of the tilt mechanism 301, while FIG. 3B illustrates a left or side view (from the perspective of the "3B-3B" line in FIG. 3A). As illustrated, the tilt mechanism 301 includes an upper gear 310 (or outer gear arc 310) and a lower gear 312 (or inner gear arc 312) that are located on concentric arcs. A tilt control handle 330 may be attached to the larger gear shaft 315 as illustrated in FIG. 3B, but may also be attached to the smaller gear shaft 319 or to the mounting block 342 (described further below). The upper gear 310 engages with a first or larger gear 314 which is affixed to the larger gear shaft 315 that extends through a slot or opening 316 in the housing 302 of the tilt mechanism 301. Likewise, the lower gear 312 engages with a second or smaller gear 318 which is affixed to the smaller gear shaft 319 that extends through slot or opening 320 in the housing 302 of the tilt mechanism 301. The tilt control handle 330 attached to large gear shaft 315 is rotated to move the large gear 314 in relation to the upper gear 310, to move the large gear 314 in relation to the small gear 318, and to move the small gear 318 in relation to the lower gear 312. When the tilt mechanism 301 is affixed through an offset support to the base and turntable, the axis formed by the centers of large gear shaft 315 and small gear shaft 319 maintains a constant fixed center located near the surface of turntable 103, thereby allowing the cutting blade 124 to make cuts offset from vertical while still positioned in the cutting channel 115.

As depicted in FIGS. 3A and 3B, the tilting mechanism 301 may include a tilt locking mechanism 336 to secure the tilt angle of the saw. As depicted, the locking mechanism may be implemented as a screw handle, pin, clamp or other fastening device attached to the second or smaller gear shaft 319 to secure one of the gears. Alternatively, the tilt locking mechanism 336 may be attached to the large gear shaft 315 or to the mounting block 342.

FIGS. 3A and 3B also illustrate an exemplary configuration of a mounting block for connecting the saw assembly 121 to the tilt mechanism 301, either in a pivoting or rail mounted configuration. As illustrated, the mounting block 342 is attached to the large gear shaft 315 and the small gear shaft 319 such that the center axis of the mounting block 342 is aligned with the axis formed by large shaft 315 and small shaft 319, such that the center axis substantially approximates the angle of the cutting blade 124 in the saw assembly 121. Alternatively, the mounting block 342 may be movably attached to all or any two of large gear shaft 315, small gear shaft 319, and tilt mechanism body 301. In addition, the design of mounting block 342 may be varied to accommodate various saw designs. Rollers 344 may be provided to facilitate movement of mounting block 342 over the tilting mechanism housing 301 as the tilt mechanism 301 is actuated. In addition, a mounting bracket 303 on the tilt mechanism 301 is used to attach to the offset support bracket 202. A dust cover boot (not shown) may optionally be used to cover slot 316 and slot 320.

In accordance with various embodiments of the present invention, the tilt mechanism 301 may be configured and attached to provide either a left tilt or right tilt for the power saw device. This may be implemented by attaching a mounting bracket comparable to bracket 303 to the left side of tilt mechanism 301 depicted in FIG. 3A and a mating bracket to the offset support 201, 201' in place of bracket 202 depicted in FIGS. 2A, 2B, 2C and 2D. Additionally, a dual tilt function may be implemented with a tilt mechanism having extended upper and lower gear arcs to provide both right and left tilt about the center axis.

Cutting operations may be facilitated in connection with the multi-function power saw device of the present invention by providing predetermined markings and/or settings on the device to assist with the sizing and placement of board cuts. For example, scale markings may be affixed to tilt mechanism 301 to indicate the degree of tilt. In addition, preset stops for commonly used tilt angles may be affixed to tilt mechanism 301. Likewise, a ruler on the turntable 103 or base 101 may indicate distances along the rip cut and cross cut directions. Also, scale markings on offset support members 205 and 207 may indicate blade height.

FIGS. 4A-C illustrate a top view, left view and back view of a selected embodiment of a reversible fence. In particular, FIG. 4A illustrates a top view of the reversible fence 401, while FIG. 4B illustrates a left or side view of fence 401 (from the perspective of the "4B-4B" line in FIG. 4A) and FIG. 4C illustrates a back view of fence 401 (from the perspective of the "4C-4C" line in FIG. 4B). As depicted in FIGS. 4A-C, the reversible fence 401 includes a miter position slide member 403 that is configured for insertion into a guide channel 114 in the base 101, and a corresponding miter cut guide surface 401a. Once engaged in the base 101 in a miter saw configuration, a locking device 412 may be used to lock the fence 401 into position by inserting the locking device 412 through a hole 407 formed in the fence 401 and into a hole in the base 101 (not shown) corresponding with hole 407.

The reversible fence 401 also includes a table saw position slide member 405 extending perpendicularly from the front or guiding face 401a of the reversible fence 401. The table saw position slide member 405 is configured for insertion into the guide channel 114 in the base 101 and turntable 103 when the power saw is configured as a table saw to make rip cuts. Thus, in the rip position, the table saw position slide member 405 is inserted into guide channel 114 and may be locked or secured into a predetermined or desired position with locking device 412 which fits through a slot 409 formed in the member 405 and into the previously described hole in the base 101 (not shown). Slot 409 allows the reversible fence 401 to be moved toward or away from blade 124 to obtain different widths of rip cuts as desired.

Figure 5A:
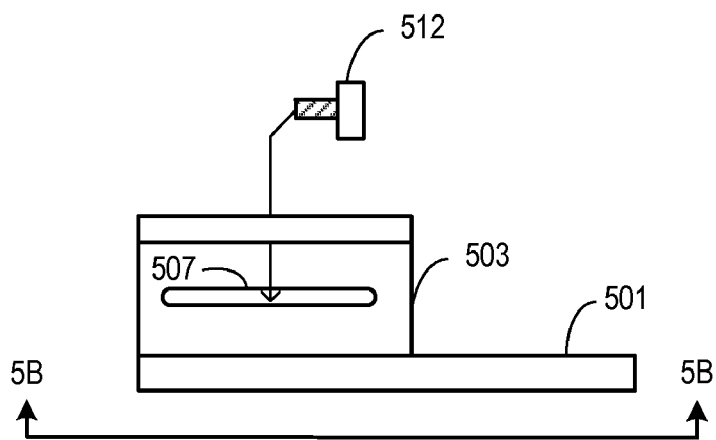
FIG. 5A is a top view of a selected embodiment of a removable fence.
Figure 5B:
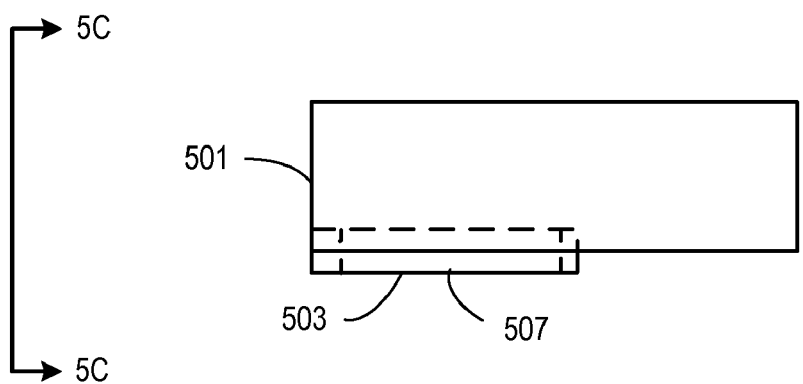
FIG. 5B is a front view of the removable fence depicted in FIG. 5A.
Figure 5C:
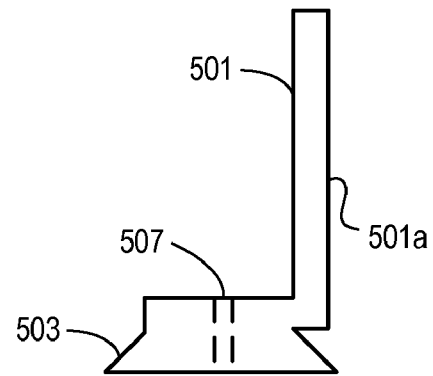
FIG. 5C is a left view of a removable fence depicted in FIG. 5A.

FIGS. 5A-C illustrate a top view, front view and left view of a selected embodiment of a removable fence. In particular, FIG. 5A illustrates a top view of the removable fence 501, while FIG. 5B illustrates a front view of fence 501 (from the perspective of the "5B-5B" line in FIG. 5A) and FIG. 5C illustrates a left or side view of fence 501 (from the perspective of the "5C-5C" line in FIG. 5B). As depicted in FIGS. 5A-C, the removable fence 501 includes a miter position slide member 503 that is configured for slidable engagement with guide channel 114 in the base 101. Once engaged in the guide channel, a locking device 512 may be used to lock the removable fence 501 into position by inserting the locking device 512 through slot 507 formed in the fence 501 and into a hole in the base 101 (not shown). When the power saw is configured as a table saw to make rip cuts, slot 507 allows the removable fence 501 to be moved to provide clearance for the material being cut. In addition, fence 501 may be removed altogether.

Figure 6A:
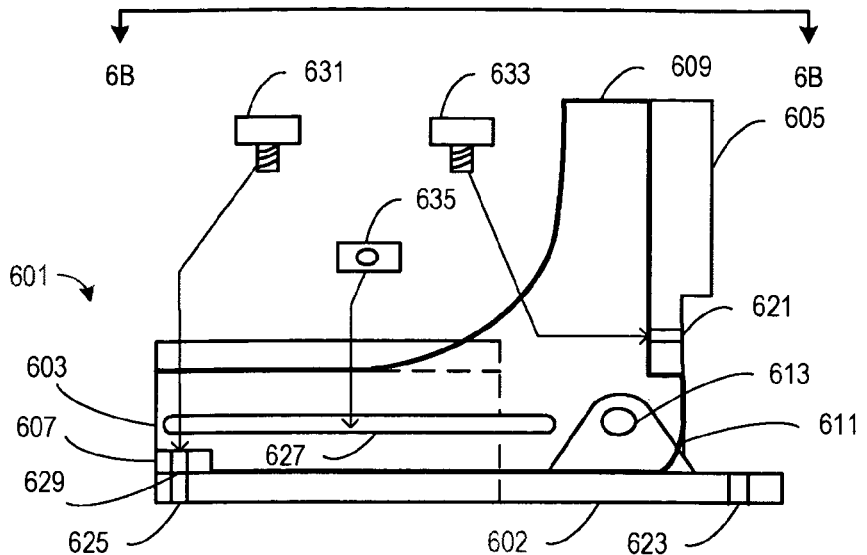
FIG. 6A is a top view of a selected embodiment of a pivoting fence.
Figure 6B:
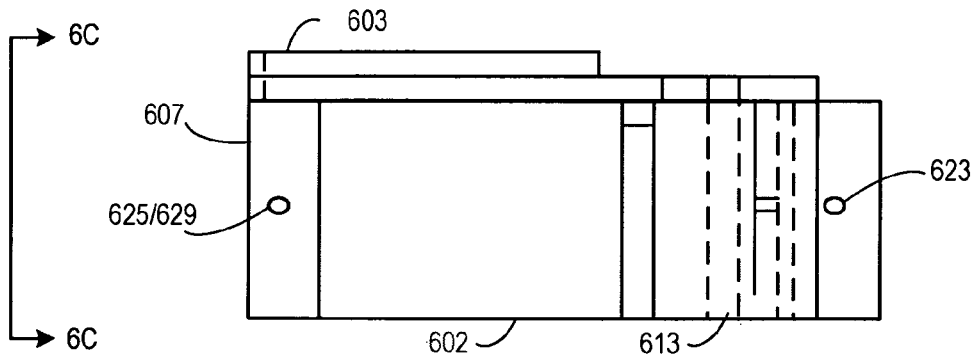
FIG. 6B is a back view of the pivoting fence depicted in FIG. 6A.
Figure 6C:
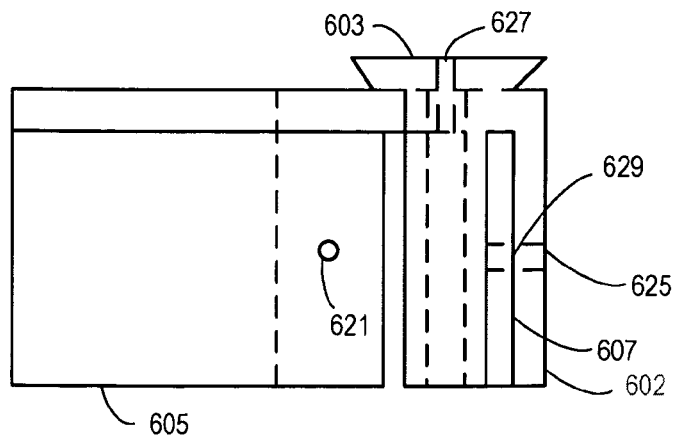
FIG. 6C is a left view of a pivoting fence depicted in FIG. 6A.

Turning now to FIGS. 6A-C, top, back and left views, respectively, are illustrated of a selected embodiment of a pivoting fence 601 that may be attached to base 101. In particular, FIG. 6A illustrates a top view of the first pivoting fence member 602 and second pivoting fence member 605, while FIG. 6B illustrates a back view of a pivoting fence members 602, 605 (from the perspective of the "6B-6B" line in FIG. 6A) and FIG. 6C illustrates a left or side view of a pivoting fence members 602, 605 (from the perspective of the "6C-6C" line in FIG. 6B). As depicted in FIGS. 6A-C, the pivoting fence member 605 is affixed to a slide member 603 that is configured for insertion into a guide channel 114 in the base 101 and turntable 103. The slide member 603 may then be locked into engagement with the base 101 with locking device 635 which fits through slot 627 and into a hole in base 101 (not shown).

When the multi-function power saw device is configured as a miter saw, the pivoting fence member 602 may be held in the miter position (as illustrated in FIG. 6A) with a locking device 631 which fits through a hole 629 in post 607 and into hole 625 in the pivoting fence 601. In this configuration, the front or guiding face of the pivoting fence 601 (bottom of FIG. 6A) is used to guide or secure a board that is being cross cut by the blade 124.

On the other hand, when the multi-function power saw device is configured as a table saw to perform rip cuts, the pivoting fence member 602 may be rotated counter-clockwise about pivot point 613 so that the front or guiding face of the pivoting fence member 602 (bottom of FIG. 6A) is aligned with the guiding face of the pivoting fence member 605 (on the right side of FIG. 6A). To configure the pivoting fence for rip cuts, the locking device 631 is released and fence member 602 is pivoted about pivot point 613 via hinge 611. To secure the pivoting fence member for rip cuts, a locking device 633 is provided that fits through hole 621 in fence 605 and into hole 623 to form a continuous rip fence. In this configuration, the front or guiding faces of the pivoting fence members 602 and 605 are aligned to guide or secure a board that is being rip cut by the blade 124. The slot 627 allows the pivoting fence 601 to be moved toward or away from blade 124 to obtain different widths of rip cuts.

Figure 7A:
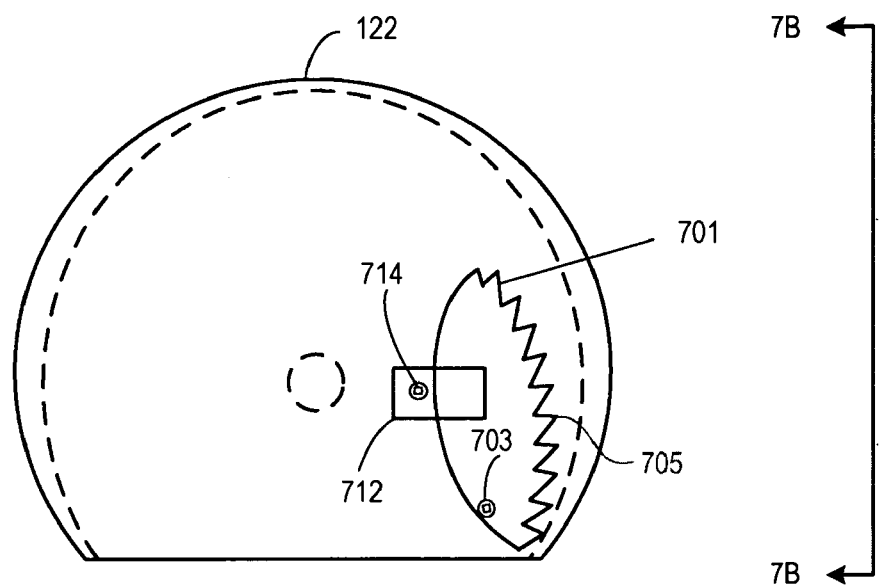
FIG. 7A is a left view of a blade guard with anti-kickback devices.
Figure 7B:
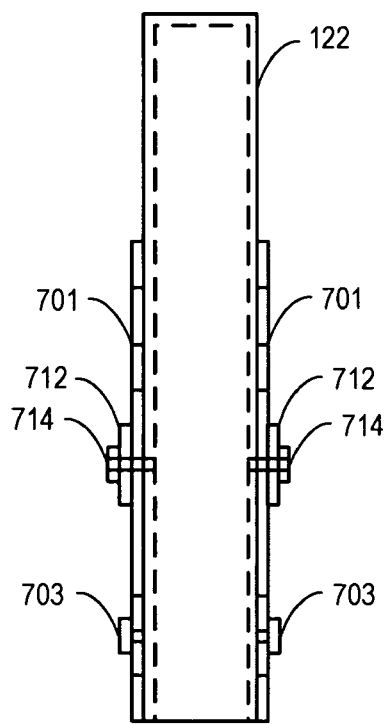
FIG. 7B is a front view of a blade guard with anti-kickback devices.

FIGS. 7A-B illustrate a left or side view and front view of a selected embodiment of a blade guard with an anti-kickback device. In particular, FIG. 7A illustrates a side view of the anti-kickback device, while FIG. 7B illustrates a front view of anti-kickback device (from the perspective of the "7B-7B" line in FIG. 7A). As depicted in FIGS. 7A and 7B, the saw assembly includes a blade guard 122 with an anti-kickback device 701 which rotates about pivot point 703 (which may be a screw, bolt or the like) and which is held in the stored position for miter operations by retainer 712 attached to blade guard 122 by fastener 714. For ripping and dado operations, the anti-kickback device 701 is rotated to a down position about the axis of fastener 703. The teeth 705 of the anti-kickback device 701 may be slanted counter-clockwise (e.g., by approximately fifteen degrees) so that the teeth 705 slant to the right (from the perspective depicted in FIG. 7A) when the device 701 is rotated down. The slanted teeth 705 allow material or cutting boards to move freely from left to right, but will stop or snag any material moving right to left (such as occurs when there is kickback).

As described herein, the offset support, saw assembly support, tilt mechanism, and/or fences can be made to be either "right handed" or "left handed" so as to function on either side of the saw blade. To facilitate measurements of the cutting angles, heights, depths and the like, various preset stops and markings may be provided specifying the cutting blade height and angle, such as a rip scale on the device base and turntable, a tilt scale on the tilt mechanism, preset stops on the tilt mechanism, preset stops on the height adjustment mechanism, and a height scale on the height adjustment mechanism.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A power saw comprising:
   a saw assembly comprising a cutting blade for cutting along a cutting plane;
   a base assembly for supporting a board to be cut by the saw assembly, the saw assembly being movably disposed above the base assembly;
   an offset support affixed to the base assembly and extending above the base assembly for supporting the saw assembly, said offset support being offset from said cutting plane to permit both rip cut and cross cut operations by the saw assembly;
   a tilt mechanism rotatably affixing the saw assembly to the offset support for rotating a cutting angle of the cutting blade while substantially maintaining the cutting blade in the cutting plane, said tilt mechanism comprising:
   a housing, a mounting bracket affixed to the housing for connecting the tilt mechanism to the offset support, an outer gear arc and an inner gear arc concentrically disposed in the housing, first and second gears operatively engaged with one another and with the inner and outer gear arcs so as to maintain a synchronous axis when either gear is rotated, and a mounting block for connecting the saw assembly to the tilt mechanism and slidably engaged to guide movement of the saw assembly; and a reversible fence secured to the base assembly and comprising a guide surface, where the reversible fence may be secured to the base assembly in a first orientation so that the guide surface is perpendicular to the cutting axis during cross cut operations, and where the reversible fence may be secured to the base assembly in a second orientation so that the guide surface is parallel to the cutting axis during rip cut operations.

2. The power saw of claim 1, where the base assembly comprises a base and a turntable with guide channels and a turntable lock.

3. The power saw of claim 1, where the offset support comprises a laterally displaced support assembly that provides a clear path in line with the cutting plane of the cutting blade so that boards can be rip cut when the power saw is configured as a table saw.

4. The power saw of claim 1, where the offset support comprises a lower lateral extension member affixed to the base assembly, a vertical extension member operably connected to the lower lateral extension member and an upper lateral extension member operably connected to the vertical extension member and affixed to the tilt mechanism.

5. The power saw of claim 1, where the offset support comprises a lower support arm affixed to the base assembly, an upper support arm slidably engaged with the lower support arm, and a height adjustment structure for securing the lower support arm to the upper support arm.

6. The power saw of claim 5, further comprising preset stops and markings for specifying a height for the cutting blade.

7. The power saw of claim 1, where the saw assembly comprises a motor, a blade guard, and an anti-kickback device.

8. The power saw of claim 1, where the base assembly comprises a guide channel and the reversible fence comprises a slide member for slidable engagement with the guide channel.

9. The power saw of claim 1, further comprising a removable fence having a miter cut guide surface where the removable fence is secured to the base assembly so that the miter cut guide surface is perpendicular to the cutting axis during cross cut operations, and where the removable fence may be removed from the base assembly during rip cut operations.

10. The power saw of claim 1, further comprising a pivoting support rotatably affixing the saw assembly to the offset support for pivoting the saw assembly up and down about a pivoting axis.

11. The power saw of claim 1, further comprising a rail support for slidably affixing the saw assembly to the offset support to move the saw assembly forward and backward in line with the cutting plane.

\* \* \* \* \*